United States Patent
Hashimoto et al.

(10) Patent No.: US 11,184,533 B2
(45) Date of Patent: Nov. 23, 2021

(54) IMAGING DEVICE

(71) Applicant: Panasonic Intellectual Property Management Co., Ltd., Osaka (JP)

(72) Inventors: Shingo Hashimoto, Osaka (JP); Yuichi Suzuki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/765,774

(22) PCT Filed: Aug. 23, 2019

(86) PCT No.: PCT/JP2019/033075
§ 371 (c)(1),
(2) Date: May 20, 2020

(87) PCT Pub. No.: WO2020/129304
PCT Pub. Date: Jun. 25, 2020

(65) Prior Publication Data
US 2021/0227135 A1    Jul. 22, 2021

(30) Foreign Application Priority Data
Dec. 19, 2018 (JP) .............................. JP2018-237560

(51) Int. Cl.
*H04N 5/225* (2006.01)
*H04N 5/232* (2006.01)

(52) U.S. Cl.
CPC ... *H04N 5/23241* (2013.01); *H04N 5/232941* (2018.08)

(58) Field of Classification Search
CPC ................................................. H04N 5/23241
See application file for complete search history.

(56) References Cited

U.S. PATENT DOCUMENTS

2003/0011704 A1* 1/2003 Sawachi ............... H04N 7/142
 348/372
2005/0219406 A1* 10/2005 Ohsawa ........... H04N 5/232411
 348/372

(Continued)

FOREIGN PATENT DOCUMENTS

JP    H06-178452 A    6/1994
JP    2003-101624 A   4/2003

(Continued)

OTHER PUBLICATIONS

International Search Report for corresponding Application No. PCT/JP2019/033075, dated Nov. 5, 2019.

*Primary Examiner* — Twyler L Haskins
*Assistant Examiner* — Dwight Alex C Tejano
(74) *Attorney, Agent, or Firm* — Renner, Otto, Boisselle & Sklar, LLP

(57) ABSTRACT

An imaging device is an imaging device in and from which a battery can be fitted, including a USB port and a body controller. The USB port can be connected to an external device via a USB cable and supply power to the imaging device from the external device. The body controller detects whether or not the battery has been removed from the imaging device while the power is being supplied from the external device to the imaging device in a case where the external device is a USB PD-compliant device, and according to the detection, the controller cuts off the power supply from the external device.

8 Claims, 9 Drawing Sheets

(56) References Cited

U.S. PATENT DOCUMENTS

| | | | |
|---|---|---|---|
| 2007/0182846 A1 | 8/2007 | Uchida | |
| 2007/0280630 A1* | 12/2007 | Komoda | H04N 5/772 386/277 |
| 2011/0156659 A1* | 6/2011 | Saeki | G03B 7/26 320/138 |
| 2013/0169861 A1* | 7/2013 | Yoshino | H04N 5/23293 348/372 |
| 2014/0184897 A1* | 7/2014 | Degura | H04N 5/23241 348/372 |
| 2017/0251904 A1* | 9/2017 | Kasumi | A61B 1/00032 |
| 2018/0004694 A1* | 1/2018 | Nemoto | G06F 13/4081 |
| 2018/0181177 A1* | 6/2018 | Fukute | H04N 1/00907 |
| 2019/0097276 A1* | 3/2019 | Tanaka | H02J 7/02 |
| 2020/0004308 A1* | 1/2020 | Moritomo | G06F 1/266 |
| 2020/0106291 A1* | 4/2020 | Inai | H02J 7/00 |
| 2020/0117258 A1* | 4/2020 | Ichikawa | H02J 7/0068 |
| 2020/0314398 A1* | 10/2020 | Zhang | H04N 9/3179 |
| 2020/0335995 A1* | 10/2020 | Hasegawa | G03B 7/26 |

FOREIGN PATENT DOCUMENTS

| | | |
|---|---|---|
| JP | 2004-227381 A | 8/2004 |
| JP | 2007-158604 A | 6/2007 |
| JP | 2007-214786 A | 8/2007 |
| JP | 2013-080392 A | 5/2013 |
| JP | 2013-239060 A | 11/2013 |
| JP | 2014-188931 A | 10/2014 |

\* cited by examiner

FIG. 7

| Connected device /with or without body battery \ Operation | I. USB PD-compliant device | | | | II. Non-USB PD-compliant device | | | |
|---|---|---|---|---|---|---|---|---|
| | PC | | USB AC adapter | | PC | | USB AC adapter | |
| | With battery | Without battery | With battery | Without battery | With battery | Without battery | With battery | Without battery |
| A. Camera power source SW OFF | Charge | Not charge | Charge | Not charge | Charge | Not charge | Charge | Not charge |
| B. Camera power source SW ON | MASS/PTP Connection<br><br>Deliver power<br><br>Charge | – | Deliver power<br><br>Charge | – | MASS/PTP Connection<br><br>Deliver power<br><br>Not charge | – | Deliver power<br><br>Not charge | – |

IMAGING DEVICE

TECHNICAL FIELD

The present disclosure relates to an imaging device in and from which a battery can be fitted and removed, and particularly relates to an imaging device that can receive a supply of power provided by USB power delivery (PD).

BACKGROUND ART

Electronic devices that can receive a supply of power provided via USB are known (for example, refer to Patent Literature 1).

SUMMARY OF INVENTION

Technical Problem

When a camera is connected to a device compliant with the USB PD specification (referred to below as a USB PD-compliant device), the camera is driven by a power supply from the device. Consequently, when a user pulls out a USB cable, the power supply from the device is cut off, and driving of the camera is stopped as long as there is no power supply from a battery. In particular, the user is often not aware of whether or not a battery is fitted in the camera, and pulling out the USB cable while a battery is not fitted in the camera may unintentionally stop a function of the camera. When the driving of the camera stops while an image is being recorded on a recording medium, there is a possibility of data being damaged. When the driving of the camera stops during a firmware update, there is a possibility that a fault will occur in a program and the camera will be unable to start.

The present disclosure provides an imaging device which complies with the USB PD specification and can be safely supplied with power.

Solution to Problem

An imaging device of the present disclosure is an imaging device in and from which a battery can be fitted and removed, the imaging device comprising a power supply terminal and a controller. The power supply terminal is configured to be connected to an external device via a USB cable and supply power to the imaging device from the external device. The controller is configured to detect whether or not the battery has been removed from the imaging device while the power is being supplied from the external device to the imaging device in a case where the external device is a USB PD-compliant device, the controller configured to cut off the power supply from the external device according to the detection.

Advantageous Effects of Invention

According to the imaging device of the present disclosure, a supply of power can be safely received in an imaging device compliant with the USB PD specification.

BRIEF DESCRIPTION OF DRAWINGS

FIG. 4 is a diagram of a control flow for setting a power source of the imaging device to ON;

FIG. 7 is a table detailing actions that can be carried out by the imaging device according to a connected device in Embodiment 1;

DESCRIPTION OF EMBODIMENTS

Embodiments are described in detail below with reference made to the drawings, as appropriate. There are cases of omitting descriptions that are more detailed than necessary. For example, there are cases of omitting detailed descriptions of matters that are already well-known, and repetitive descriptions of substantially identical configurations. This is to avoid unnecessary redundancy in the following descriptions, and to make comprehension easier for those skilled in the art. The inventors have provided the accompanying drawings and the following descriptions in order for those skilled in the art to sufficiently comprehend the present disclosure, and have not intended to thereby limit the scope of the disclosure as set forth in the claims.

Figure 8:
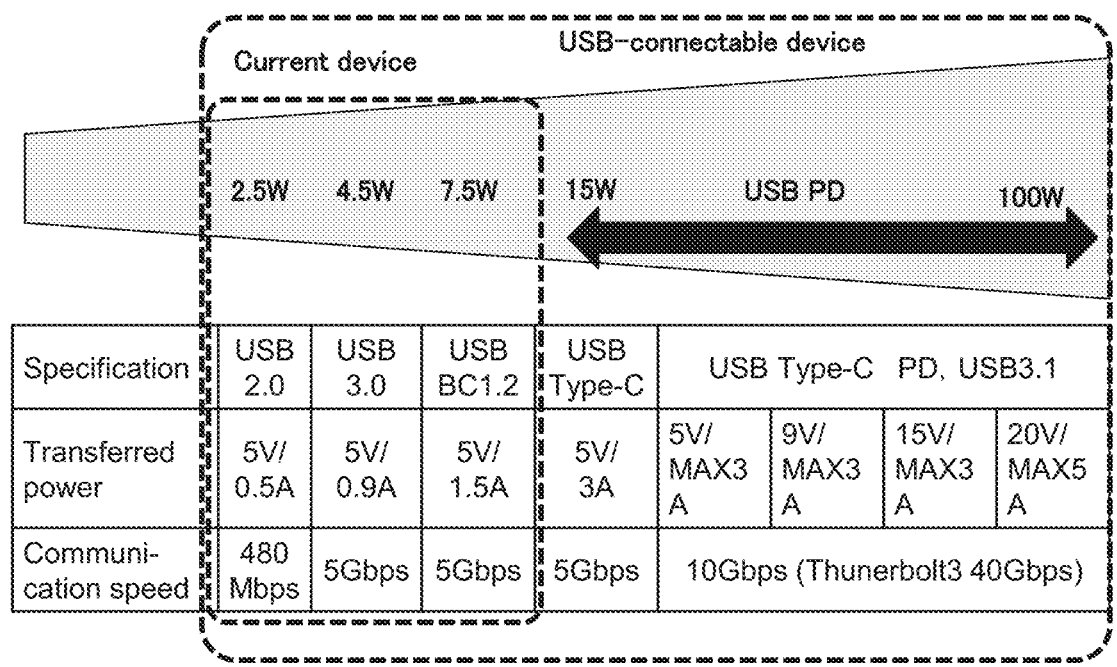
FIG. 8 is a table of power and communication speeds for USB-connectable devices of different specifications.

In the following descriptions, an external USB-connectable device and an imaging device can be connected via a USB cable having a plug complying with various USB specifications, which are shown in FIG. 8, and the plug is fitted in and removed from a USB port 16 of an imaging device (described hereinafter). A USB PD-compliant device, as shown in FIG. 8, is a device complying with the standard of being able to supply 15 W to 100 W, and is the first type of device to be able to simultaneously charge and deliver power (supply power for driving the imaging device), as is described hereinafter.

Among USB-connectable devices, current USB-connectable devices meet the specifications of USB 2.0, USB 3.0, and USB BC1.2, and these devices transfer power of approximately 5 V/0.5 A to 5 V/1.5 A, as shown in FIG. 8. However, such current USB-connectable devices are capable of supplying power at 7.5 W or less, and it has therefore not been possible to obtain sufficient power to drive all functions of an imaging device, even when the battery for the connected imaging device can be charged. A USB PD-compliant device can transfer power up to 100 W, as shown in FIG. 8. Therefore, in an imaging device connected to a USB PD-compliant device, not only will the battery be charged, but also drive power will be obtained.

Figure 9:
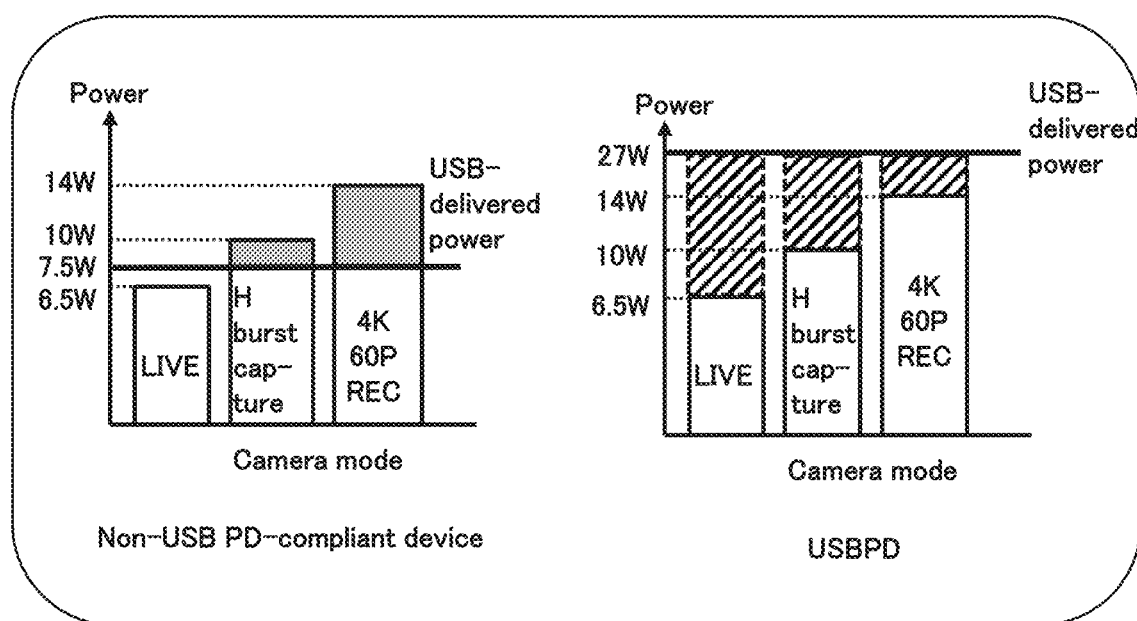
FIG. 9 is a graph comparing power that can be supplied with a USB PD-compliant device and a Non-USB PD-compliant device, relative to power consumption of the imaging device.

The driving of the imaging device consumes different amounts of power depending on an action mode of the imaging device. FIG. 9 is a graph that shows power consumption when main functions of an imaging device are carried out. Examples of the main functions include a live view (LIVE), high-speed burst capturing (H burst capturing), and recording a 4K image at a frame rate of 60 P (4k60P REC). The imaging device consumes about 10 W of power for high-speed burst capturing, and 14 W of power for 4k60P REC, as shown in FIG. 10. However, as is described above, in the case of a current USB-connectable device that is not a USB PD-compliant device (a Non-USB PD-compliant device), at most 7.5 W of power can be supplied, and these main functions of the imaging device therefore cannot be carried out with the transferred power from the current USB-connectable device. Consequently, the battery supplies the rest of the power needed (the gray parts in the left graph of FIG. 9) in addition to using transferred power from the Non-USB PD-compliant device. In this case, when a battery is not fitted or the battery has insufficient charge, the imaging device cannot be driven.

With a USB PD-compliant device, as shown in the right-hand graph of FIG. 9, not only is it possible to provide the drive power needed to carry out the main functions of the imaging device, excess power from the power delivery (slanted-line parts in the right-hand graph) can be used to charge the battery.

In light of the above, an imaging device according to the present disclosure shall be described.

1. Embodiment 1

An imaging device according to Embodiment 1 is described below with reference to FIGS. 1 to 5.

[1-1. Configuration]

Figure 1:
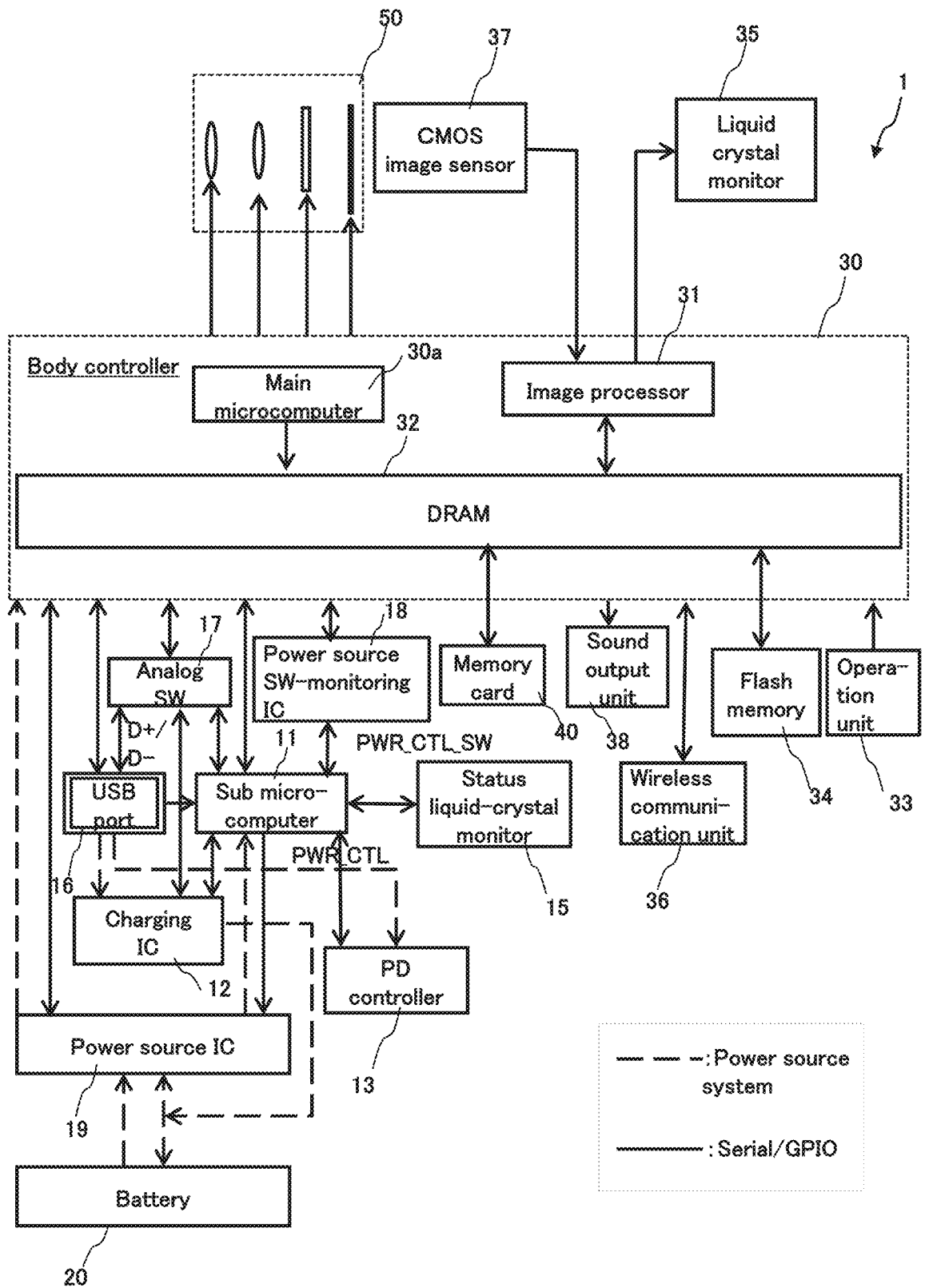
FIG. 1 is a diagram of an overall configuration of an imaging device according to Embodiment 1.

FIG. 1 shows an overall configuration of an imaging device 1 according to Embodiment 1. The imaging device 1 is, for example, an integrated-lens digital camera capable of imaging still images and/or moving images.

The imaging device 1 comprises a sub microcomputer 11, a charging integrated circuit (IC) 12, a PD controller 13, a status liquid-crystal monitor 15, a USB port 16, an analog switch 17, a power source switch-monitoring integrated circuit (IC) 18, a power source integrated circuit (IC) 19, and a battery 20. These components activate in a control of power supply to the imaging device 1, as is described hereinafter.

The imaging device 1 further comprises a body controller 30, an operation unit 33, a flash memory 34, a liquid crystal monitor 35, a wireless communication unit 36, a CMOS image sensor 37, a sound output unit 38, and a memory card 40. The imaging device 1 also comprises an optical system 50 securely attached to a body of the imaging device. Through actions of the body controller 30, these components carry out the main functions of the imaging device 1. The main functions of the imaging device 1 include imaging, image processing, inputting/outputting image data, writing and/or reading of image data in a recording medium, update processing of firmware and other software, etc.

In FIG. 1, dashed-line arrows indicate a flow of a signal relating to power supply, and solid-line arrows indicate a flow of a serial signal or a parallel signal for other communications and/or controls. Functions of the components including signal exchange are described below.

The sub microcomputer 11 includes a CPU and/or a memory such as a ROM and a RAM. The sub microcomputer 11 switches the analog switch 17 and inputs a D+/D− signal from the USB port 16 to the body controller 30, the sub microcomputer 11, or the charging IC 12. The sub microcomputer 11 obtains a result of a port determination from the charging IC 12. The sub microcomputer 11 detects a signal (High signal or Low signal) generated in response to fitting and removing of the battery 20 when the power source is OFF, and determines whether or not the battery 20 is fitted in. The sub microcomputer 11 acquires a remaining charge of the battery 20. For the remaining charge of the battery 20, for example, a voltage value of the battery 20 may be monitored by the power source IC 19, and the remaining charge of the battery 20 may be acquired in accordance with the voltage value.

The charging IC 12 controls the supply of power from the USB port 16. Through this control, power obtained from the USB port 16 is used to charge the battery 20 or start up the body controller 30 of the imaging device 1.

The charging IC 12 is also connected to the sub microcomputer 11, and the charging IC performs a port determination (described hereinafter). The port determination determines a type of the connected device. For example, the port determination determines if the connected device is a personal computer (PC), an AC adapter, etc.

The PD controller 13 performs a negotiation with the connected device via a configuration channel (CC) terminal of the USB port 16. In the negotiation, a direction of power supply between the imaging device 1 and the connected device, a setting of current/voltage, roles of terminals, etc., are decided via the CC terminal, as described hereinafter. The sub microcomputer 11 determines whether or not the connected device is a USB PD-compliant device by acquiring the results of the negotiation from the PD controller 13.

The status liquid-crystal monitor 15 is a display disposed on the body of the imaging device 1 (e.g., on an upper surface of the body), separately from the liquid crystal monitor 35. The status liquid-crystal monitor 15 displays messages, etc., that correspond to commands from the sub microcomputer 11.

The USB port 16 (one example of a power supply terminal) is a type C terminal, and connects an external device to the imaging device 1 via a USB cable (not shown). The USB port 16 includes a VBUS terminal for a power source, a GND terminal, the above-described CC terminal, and/or a terminal for D+ and D− signals. The connected device has similar terminals, and pulls up a CC and monitors voltage of the CC terminal. The connected device supplies voltage to the VBUS upon detecting a pulling down of the CC on the imaging device 1 side. Power is thereby supplied to the imaging device 1 side.

The analog switch 17 is switched under control by the sub microcomputer 11, and the analog switch connects the USB port 16 to either the sub microcomputer 11, the body controller 30, or the charging IC 12. When there has been an input signal (D+, D−) from the USB port 16, the analog switch 17 connects the USB port 16 to the charging IC 12, and the charging IC 12 performs a port determination. When, as a result of the port determination, the connected device is, for example, a PC and the PC communicates with the imaging device 1, the analog switch 17 connects the USB port 16 to the body controller 30. After the connected device and the imaging device 1 have connected, when enumeration, which is an exchange of data for mutual authentication, is carried out and power from the VBUS is determined by the sub microcomputer 11, the analog switch 17 connects the USB port 16 to the sub microcomputer 11.

The power source switch-monitoring IC 18 is a circuit that monitors whether or not an operation to turn a power source switch (not shown) of the imaging device 1 from OFF to ON (referred to below as an ON operation) has been performed. When the power source switch has been operated to ON, the power source switch-monitoring IC 18 transmits a signal to the sub microcomputer 11 via a general-purpose input/output (GPIO) terminal.

When a battery 20 has been fitted, the power source IC 19 controls the supply of power from the battery 20. The power source IC 19 also performs execution and interruption of the supply of power to the body of the imaging device 1 in accordance with the power source switch of the imaging device 1 being operated ON and OFF.

The battery 20 supplies power for activating the imaging device 1. The battery 20 may be a primary battery or a secondary battery. The battery 200 may be an internal battery attached inside the body of the imaging device 1, or an external battery attached to an exterior of the body of the imaging device 1 by a battery grip, etc. There may be a plurality of batteries 20, and the plurality of batteries 20 may respectively include an internal battery and an external battery.

The body controller 30 (one example of a controller) comprises a main microcomputer 30*a*, an image processor 31, and a DRAM 32. The main microcomputer 30*a* is a computer device containing a CPU, a RAM and/or ROM and other memory, and peripheral circuitry. The main microcomputer 30*a* controls the actions of the entire imaging device 1, including image processing, in accordance with instructions from the operation unit 33 and/or software written into the ROM. The main microcomputer 30*a* detects a signal (High signal or Low signal) generated by the power source IC 19 in response to fitting and removing of the battery 20 when the power source is ON, and determines whether or not the battery 20 is fitted in.

The image processor 31 performs prescribed image processing on image data outputted from the CMOS image sensor 37. The prescribed image processing includes gamma correction processing, white balance correction processing, flaw correction processing, YC conversion processing, digital zoom processing, shrink processing, stretch processing, etc. The DRAM 32 is used as working memory of the body controller 30.

The main microcomputer 30*a* may include, instead of a CPU, a processor configured from a dedicated electronic circuit designed so as to bring a prescribed function to effect. Specifically, the main microcomputer 30*a* can be brought to effect with a CPU, a MPU, a GPU, a DSU, a FPGA, an ASIC, and other various processors. The main microcomputer 30*a* may be configured from one or more processors. The main microcomputer 30*a* may also be configured from one semiconductor chip together with the image processor 31, etc.

The body controller 30 also communicates with the connected device through the USB port 16. For example, the body controller 30 communicates with the connected device during mass storage connection and/or tethered shooting.

The operation unit 33 includes a release button, other types of buttons, a directional keypad, a dial, a touch panel disposed in the liquid crystal monitor 35, etc. The user causes the functions of the imaging device 1 to be carried out by operating the operation unit 33. The operation unit 33 includes the power source switch of the imaging device 1. When the power source switch is set to ON, the body controller 30 is able to start up and the main functions of the imaging device 1 can be carried out. When the power source switch is set to OFF, the body controller 30 does not start up and the main functions of the imaging device 1 cannot be carried out.

The flash memory 34 stores image data processed by the body controller 30. The flash memory 34 also stores programs and parameters used by the body controller 30.

The liquid crystal monitor 35 (one example of an output unit) is a display disposed on, for example, a rear surface of the body of the imaging device 1. The liquid crystal monitor 35 displays image data (still images or moving images) processed by the image processor 31. The liquid crystal monitor 35 displays a setting menu for setting actuating conditions of the imaging device 1. The liquid crystal monitor 35 may include a touch panel that functions as part of the operation unit 33. Instead of the liquid crystal monitor 35, an organic EL display or another display may be used.

The wireless communication unit 36 includes a WiFi- and/or Bluetooth-compliant communication module, and the body controller 30 performs bi-directional communication control with wirelessly connected devices. The communication module may use infrared communication, a wireless local area network (LAN), etc., and is preferably capable of connecting wirelessly with external devices.

The CMOS image sensor 37 is an imaging element including a light-receiving element, an automatic gain control circuit, and an analog/digital converter. The light-receiving element converts a light signal concentrated by the optical system 50 to an electric signal, and outputs the electric signal. The automatic gain control circuit amplifies the electric signal outputted from the light-receiving element and outputs the amplified electric signal. The analog/digital converter converts the electric signal outputted from the automatic gain control circuit to a digital signal, and outputs the digital signal to the body controller 30. The CMOS image sensor 37 is controlled by a timing generator to carry out an action of imaging still and moving images, an action of imaging through images, a data-forwarding action, an electronic shutter action, etc. The image data generated by the CMOS image sensor 37 is sent to the image processor 31. Instead of the CMOS image sensor 37, an NMOS image sensor, a CCD image sensor, or another imaging element may be used.

The sound output unit 38 (one example of an output unit) outputs sound under control by the body controller 30. The sound output unit 38 is, for example, a speaker.

The memory card 40 is fitted in a memory slot, the memory card internally including a semiconductor memory or another storage element. The memory card 40 stores image data. The body controller 30 reads the image data stored in the memory card 40, processes the read image data through the image processor 31, and displays the image data on the liquid crystal monitor 35. A plurality of memory cards 40, e.g., two, may be provided.

The optical system 50 is configured from a lens barrel and is securely attached to the body of the imaging device 1. The optical system 50 includes: a group of lenses including a focus lens, a zoom lens, etc.; a drive unit for the lenses; etc. The optical system 50 is controlled and driven by the body controller 30.

[1-2. Actions]

Figure 2:
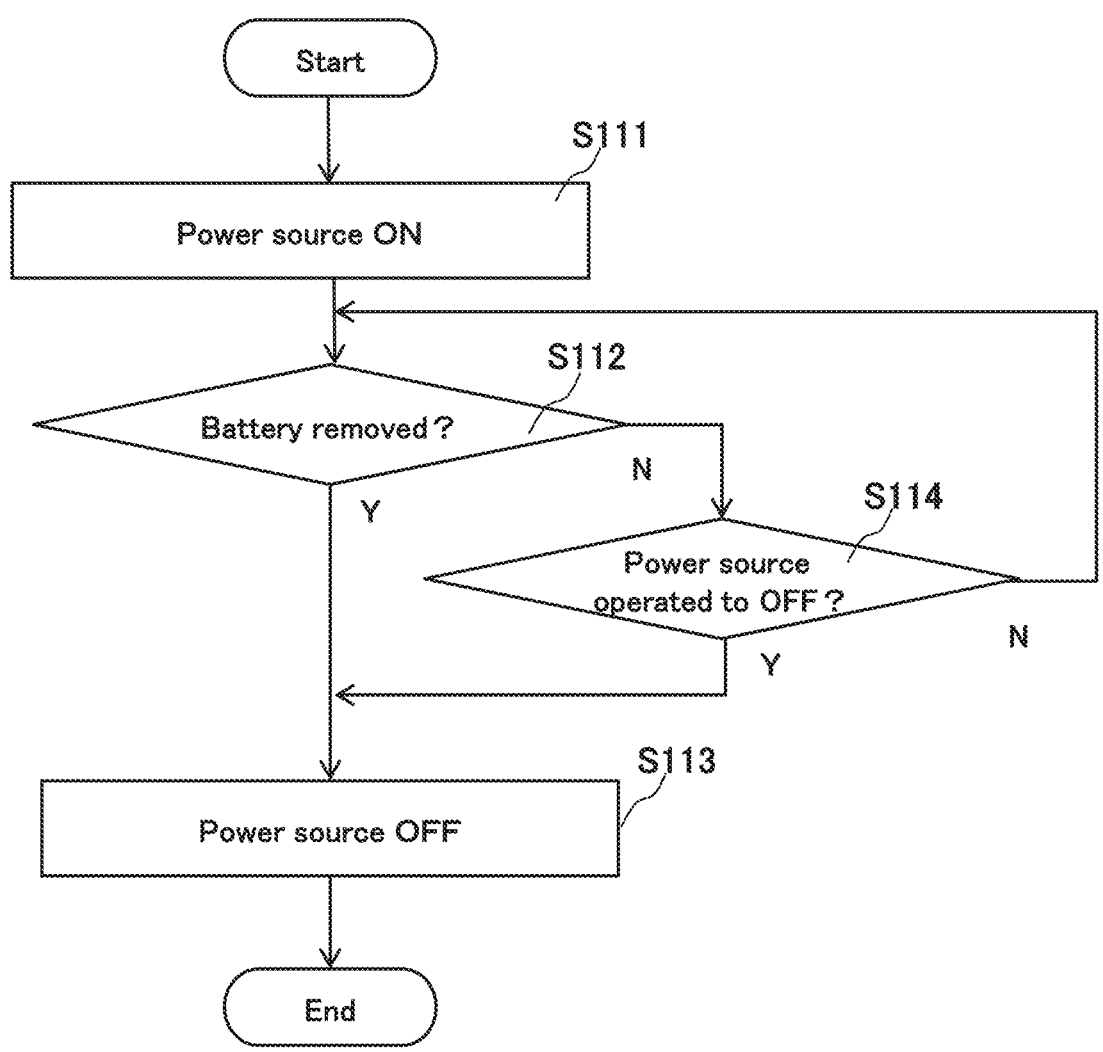
FIG. 2 is a flowchart of actions of the imaging device according to Embodiment 1.

FIG. 2 is a flowchart of an action of the imaging device 1 carried out mainly by the main microcomputer 30*a* according to Embodiment 1. In an initial state, the sub microcomputer 11 detects connection of a USB cable and determines whether or not a USB PD-compliant device is connected to the USB port 16 through a port determination by the charging IC 12 and a negotiation with the connected device by the PD controller 13.

Figure 3:
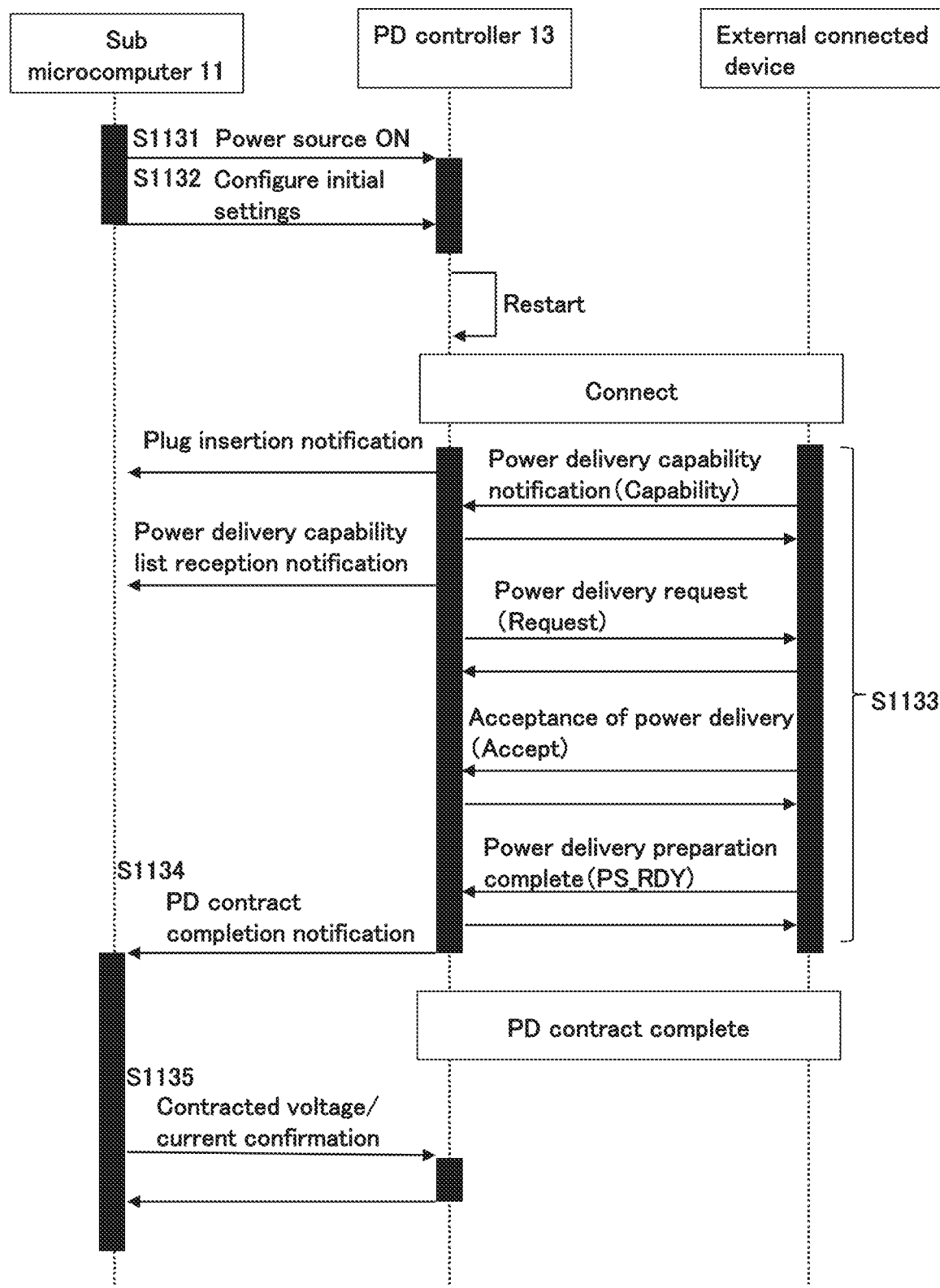
FIG. 3 is a diagram of a flow of actions of a negotiation during a USB connection.

FIG. 3 is referenced here to describe a negotiation, made via the CC terminal, for detecting that the connected device is a USB PD-compliant device.

First, the sub microcomputer 11 applies a power source to the PD controller 13 through power source control (S1311: control power source ON). Next, the sub microcomputer 11 implements the requested power/current settings in the PD controller 13 (S1132: initial settings configured). After the initial settings have been configured, the PD controller 13 restarts, and according to a setting value set in S1132, connects to the connected device and initiates the negotiation (S1133). At this time, the PD controller 13 notifies the sub microcomputer 11 that a plug of a USB cable has been inserted into the USB port 16. In the negotiation, notification of a power delivery capability is given from the connected device to the PD controller 13. At this time, the PD controller 13 issues a notification to the sub microcomputer 11 stating that a power delivery capability list has been received. By receiving this notification, the sub microcomputer 11 determines whether or not the connected device is a USB PD-compliant device. The PD controller 13 then issues a power delivery request to the connected device. Having received this request, the connected device notifies the PD controller 13 of an acceptance of the power delivery and also of a completion of a power delivery preparation.

The PD controller 13 notifies the sub microcomputer 11 that a "PD contract" including the above-described power delivery condition has been completed (S1134), and the PD contract is completed. The sub microcomputer 11 gives the PD controller 13 confirmation of the voltage and current set in the PD contract (S1135).

As a result of the negotiation described above, it is determined that the connected device is a USB PD-compliant device. An action of the imaging device 1 when the connected device is a USB PD-compliant device will be described below.

Figure 4:
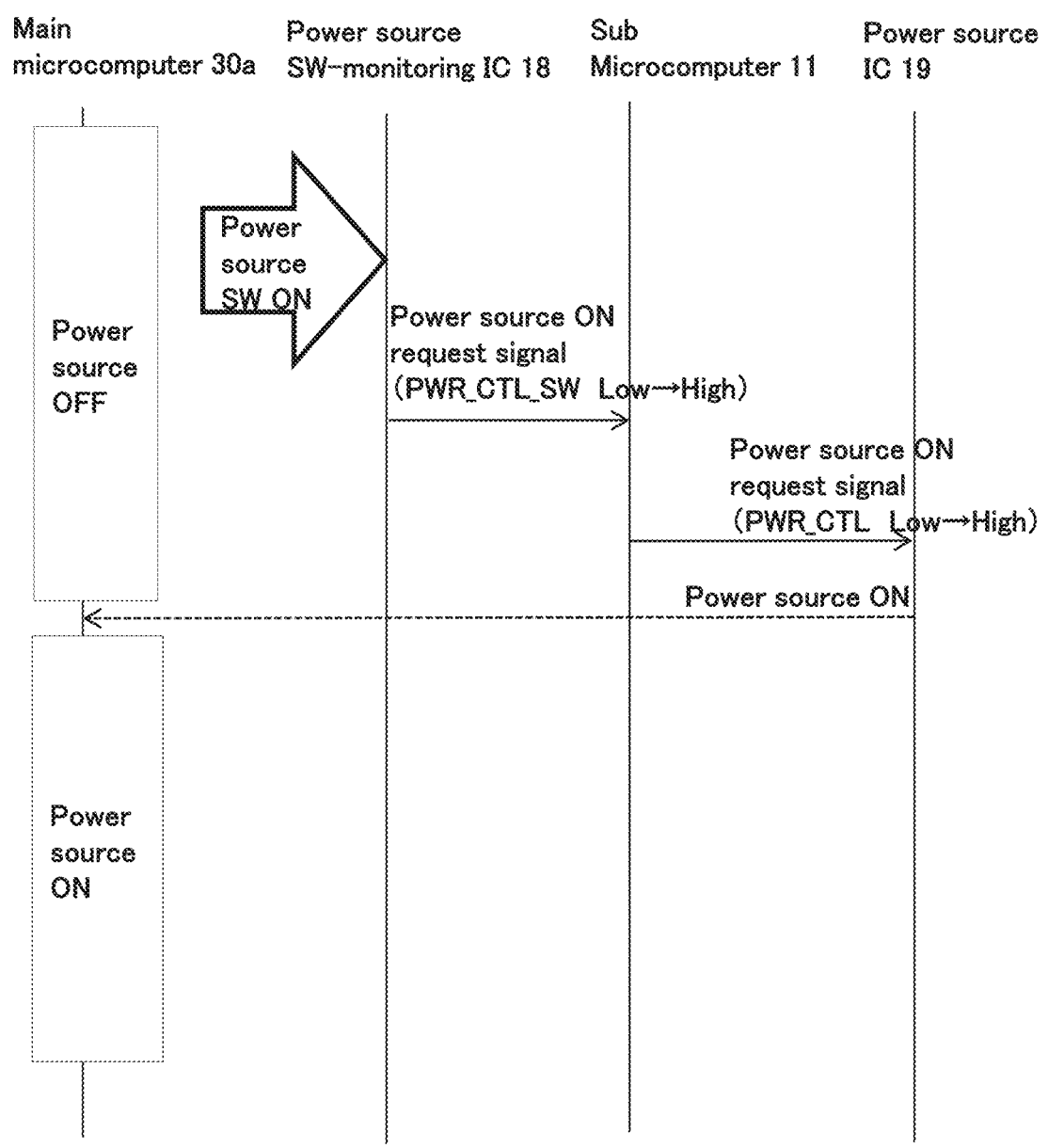

In FIG. 2, the power source of the imaging device 1 is turned ON (S111). As a result, the body controller 30 starts up and the main functions of the imaging device 1 can be carried out. FIG. 4 shows a control flow for setting a power source of the imaging device to ON. As shown in the drawing, the power source switch-monitoring IC 18 detects that the power source switch has been operated to ON, and transmits a power source ON request signal to the sub microcomputer 11. The sub microcomputer 11 transmits the power source ON request signal to the power source IC 19, whereby the power source IC 19 turns ON the power source.

Next, the main microcomputer 30a detects removing of the battery 20 (S112). The main microcomputer 30a detects a signal (High signal or Low signal) generated by the power source IC 19 in response to the removing of the battery 20.

Figure 5:
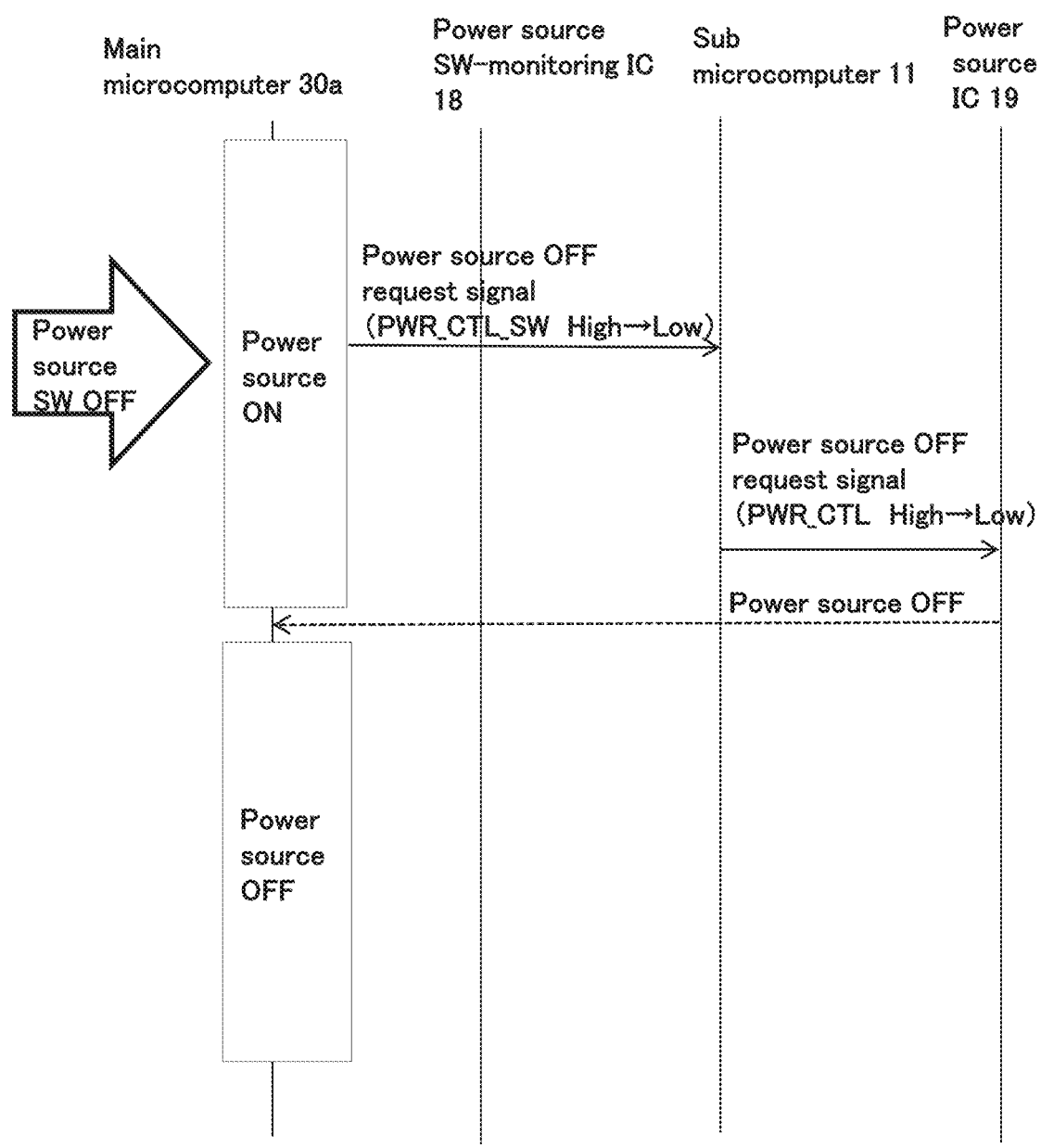
FIG. 5 is a diagram of a control flow for setting the source of the imaging device to OFF.

When the battery 20 has been removed (Yes in S112), the main microcomputer 30a turns OFF the power source of the imaging device 1 (S113). FIG. 5 shows a control flow for setting the power source to OFF. As shown in the drawing, the main microcomputer 30a of the body controller 30 transmits a power source OFF request signal to the sub microcomputer 11. The sub microcomputer 11 transmits the power source OFF request signal to the power source IC 19, and the power source IC 19 turns OFF the power source. As a result, power supply from the connected device is cut off.

When the battery 20 has not been removed, the main microcomputer 30a turns OFF the power source (S112) if the power source switch is operated to OFF (Yes in S114).

[1-3. Effects]

The imaging device 1 according to Embodiment 1 above is an imaging device in and from which a battery 20 can be fitted and removed, the imaging device 1 comprising a USB port 16 and a body controller 30. The USB port 16 is connectable to an external device via a USB cable, and delivers power from the external device to the imaging device 1. When the external device is a USB PD-compliant device, the body controller 30 detects removal of the battery 20 from the imaging device 1 while power is supplied from the external device to the imaging device 1, and in response to the detection, cuts off the supply of power from the external device.

According to the imaging device 1 of Embodiment 1, it is possible to retain the power of the battery 20 and prevent power supply from being stopped upon the USB cable being pulled out. This can prevent problems incurred due to the power supply being cut off while a main function of the imaging device 1 is carried out Such problems may include: data being damaged during recording of an image in media; an update of firmware of the body controller 30 stopping partway through and a fault occurring in a program, etc. Consequently, the imaging device 1 can safely receive a supply of power.

2. Embodiment 2

Figure 6:
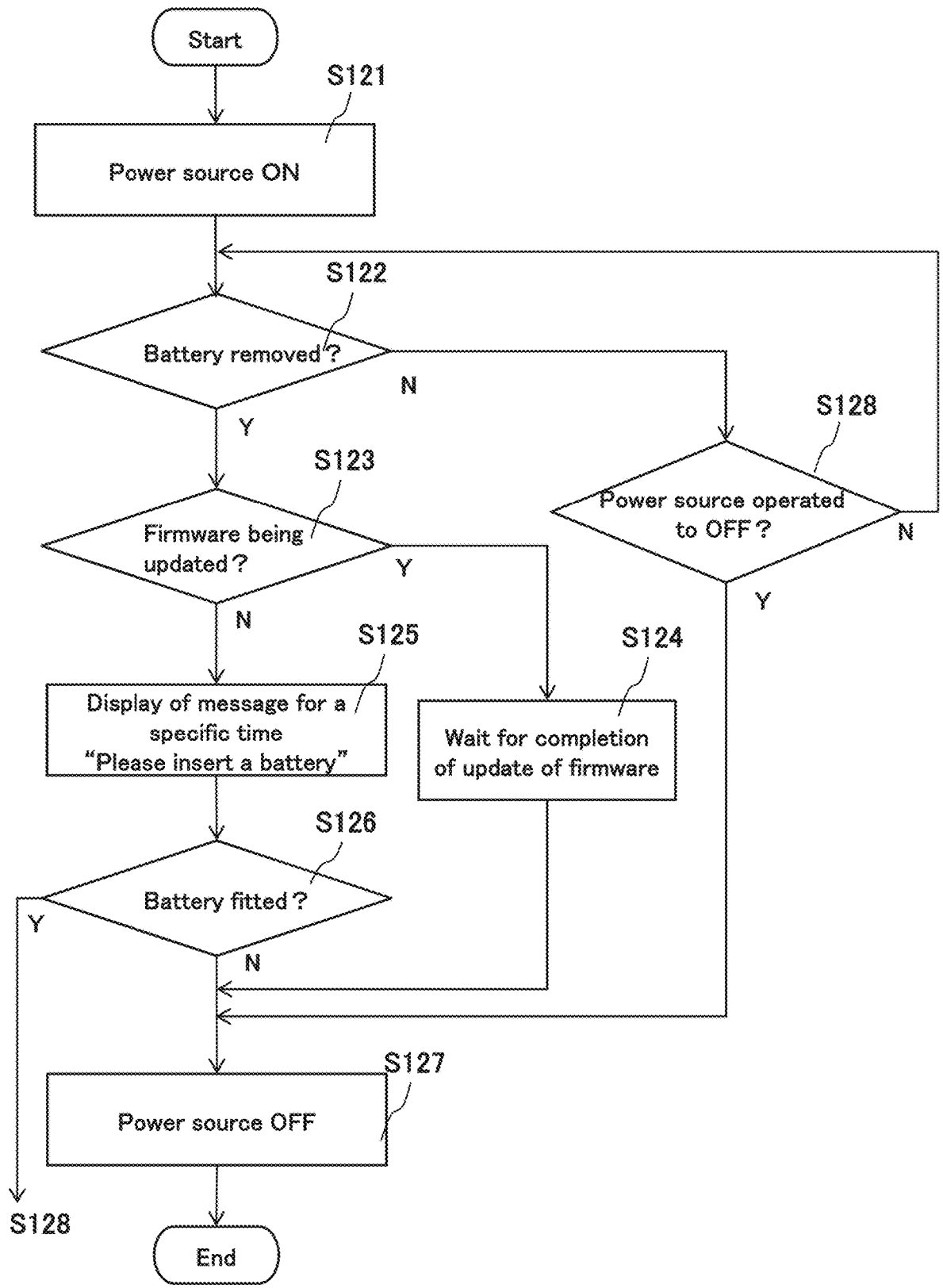
FIG. 6 is a flowchart of actions of an imaging device according to Embodiment 2.

FIG. 6 is a flowchart of an action of the imaging device 1 according to Embodiment 2. The configuration of the imaging device according to the present embodiment is similar to the configuration of the imaging device 1 shown in FIG. 1, and is therefore not described.

In Embodiment 1, the power source of the imaging device 1 is turned OFF when removal of the battery 20 is detected. However, when a main function of the imaging device 1 is being carried out, the function can be disrupted. Particularly, if the power source is turned OFF and an update of firmware of the main microcomputer 30a is stopped partway through, a fault may occur in a program so that the imaging device 1 may not be able to start up. Furthermore, there is a case where a user wants to change the battery. In that case, it is preferable for the power source not to be turned OFF right away. In order to avoid the problem, the imaging device 1 according to Embodiment 2 performs the process as shown in FIG. 6.

Similarly to step 111 in FIG. 2, the power source is turned ON (S121), whereby the body controller 30 starts up and the main functions are ready to be carried out.

Next, similarly to step S112 in FIG. 2, the main microcomputer 30a detects removal of the battery 20 (S122).

If removal of the battery 20 is detected (Yes in step S122), the main microcomputer 30a determines whether a firmware is being updated (S123). If the firmware is being updated (Yes in step S123), the main microcomputer 30a waits for completion of the update of the firmware (S124). At this time, the liquid crystal monitor 35 or the sound output unit 38 may output information notifying the firmware being updated. When detecting completion of the update of the firmware, the main microcomputer 30a turns OFF the power source (S127), similarly to step S113.

If the firmware is not being updated (No in step S122), the main microcomputer 30a waits for a specific time while causing the liquid crystal monitor 5 to display message (one example of warning information) urging the battery to be fitted in (S125). The massage may be output as sound by the sound output unit 38. The specific time is, for example, a time (e.g. 5 seconds) for a user to take for changing the battery 20.

If the main microcomputer 30a detects that the battery 20 has been fitted in within the specific time (Yes in S126), as far as the power source is not turned OFF (No in step S128), the power source is kept ON. If the main microcomputer 30a does not detect that the battery 20 is fitted in within the specific time (No in S126), the power source is turned OFF (S127).

If the battery 20 is not removed (No in step S122), the main microcomputer 30a keeps the power source ON unless the power source is operated to OFF (No in step S128).

When carrying out a specific action, the imaging device 1 according to the present embodiment keeps the power source ON until the specific action is completed while keeping a power supply in a safe manner. Therefore, it is possible to prevent a problem from being caused by stop of power supply while the specific action is carried out. Furthermore, even when the imaging device 1 is not carrying out the specific action, it turns OFF the power source after a lapse of the specific time. As a result, it is possible to prevent the power supply from being suddenly stopped, for example, during change of the battery 20.

The imaging device according to the present embodiment may determine whether image data is being recorded or not, in addition to or in place of whether the firmware is being updated in step S123 above. In this case, if the image data (still image or video) is being recorded, the main microcomputer 30a waits for completion of the image data recording. When completion of the image data recording is detected, the power source of the imaging device 1 may be turned OFF. Therefore, the data is prevented from being damaged due to the driving of the imaging device 1 being stopped during the image data recording.

The imaging device 1 according to the present embodiment does not necessarily execute all of the above processes.

For example, the imaging device 1 can execute only processes in steps S121 to S127 through S122, S123, and S124 and processes in steps S121 to S127 through S122 and S128 without executing a process relating to a lapse of a specific time. In this case, if a specific action such as firmware updating or image data recording is being carried out, the imaging device 1 turns OFF the power source after completing the specific action. If the specific action is not being carried out, it turns OFF the power source.

Alternatively, the imaging device 1 can execute only processes in steps S121 to S126 through S122 and S125 and processes in steps S121 to S127 through S122 and S128. In this case, if the battery 20 has been removed, the imaging device 1 does not execute a process based on determination on whether the specific action is being carried out. Instead, the imaging device 1 waits for a specific time and then turns OFF the power source unless the battery 20 is fitted in within the specific time.

3. Other Embodiments

Embodiments were described above as examples of the technology disclosed in the present application. However, these embodiments are not provided by way of limitation as to the technology in the present disclosure; this technology can also be applied as appropriate to embodiments in which changes, replacements, additions, omissions, etc., have been made. The constituent elements described in the above embodiments can also be combined to yield new embodiments.

(1)

As described above with reference to FIGS. 8 and 9, a current USB-connectable device is not capable of delivering sufficient power to actuate all the functions of an imaging device. A USB PD-compliant device on the other hand is capable of not only charging a battery but also delivering power for driving an imaging device. Therefore, when the connected device is a USB PD-compliant device, it is possible to supply power equal to or greater than the power consumed by the imaging device 1 during driving. FIG. 7 shows control details, which can be carried out by the microcomputer 11, the control details including charging of the battery and/or power delivery to the imaging device 1 (equivalent to drive power for carrying out the main functions of the imaging device 1), according to devices connected by USB.

I. When Connected Device is USB PD-Compliant Device

In the case of a USB PD-compliant device, charging can be performed in addition to power delivery for the drive power for the imaging device 1 because power equal to or greater than the power consumption of the imaging device 1 can be supplied.

I-A. When Power Source Switch of Imaging Device is OFF

When the connected device is a PC or an AC adapter, charging is performed when the battery 20 is fitted in the imaging device 1, and charging is not performed when the battery 20 is not fitted in.

I-B. When Power Source Switch of Imaging Device is ON

When the connected device is a PC and a battery is fitted in, charging with the excess power is performed in addition to a MASS connection or a PTP connection and the delivery of drive power for the imaging device 1. A MASS connection is a connection for transferring large-volume data of an SD card, etc. A PTP connection is a connection for transferring image data.

When the connected device is an AC adapter, charging with the excess power is performed in addition to the delivery of power when the battery is fitted in.

When the battery is not fitted in, even if the connected device is a PC or an AC adapter, the power source switch of the imaging device 1 is not turned ON as is described hereinafter, and neither power delivery nor charging is performed.

II. When Connected Device is Non-USB PD-Compliant Device

When the connected device is not a USB PD-compliant device, power sufficient to carry out both charging and power delivery can not be obtained. Consequently, charging is performed only when the power source switch of the imaging device is OFF. Specifically, the following is carried out.

II-A. When Power Source Switch of Imaging Device is OFF

When the connected device is a PC or an AC adapter, charging is performed when the battery 20 is fitted in the imaging device 1, and charging is not performed when the battery 20 is not fitted in.

II-B. When Power Source Switch of Imaging Device is ON

When the connected device is a PC, only a MASS connection or a PTP connection and power delivery are performed.

When the connected device is an AC adapter, only power delivery is performed.

When the battery is not fitted in, power delivery is not performed even if the connected device is a PC or an AC adapter.

(2) In the above embodiments, an integrated-lens digital camera was used as an example of the imaging device 1, but the device may also be a replaceable-lens camera. The imaging device 1 may be a device having an imaging function, such as a smartphone or another portable terminal.

(3) In the imaging device 1, the status liquid-crystal monitor 15 or the liquid crystal monitor 35 may be made to display information indicating whether or not the connected device is a USB PD-compliant device after the power source has been turned ON. This information may be displayed by text, icons, etc.

(4) In the example of FIG. 7, when the connected device is a Non-USB PD-compliant device and the battery 20 has been fitted in the imaging device 1, the battery 20 is charged when the power source is OFF, and only power delivery to the imaging device 1 is carried out when the power source is ON. In this case, the liquid crystal monitor 35 may display a message prompting to turn the power source from ON to OFF for a user wishing to charge the battery 20.

(5) During a state in which the actions of the main functions of the imaging device 1 can be performed by means of power from the USB port 16, the sub microcomputer 11 may issue a report presenting a warning upon sensing that the battery 20 has been taken out. This report may be, for example, displayed on the liquid crystal monitor 35 and/or the status liquid-crystal monitor 15, or outputted by audio from a speaker or another audio output unit (not shown).

(6) The sequence by which the process method in the above embodiments is carried out is not necessarily limited to what is written in the above embodiments; the sequence may be replaced or a plurality of processes may be carried out simultaneously within a range that does not deviate from the scope of the invention.

The computer program described above is not limited to being recorded on the recording medium described above; the computer program may be acquired via an electric communication circuit, a wireless or wired communication circuit, networks typified by the internet, etc.

As above, embodiments were described as examples of the technology in the present disclosure. The accompanying drawings and the detailed description were submitted for this purpose. Therefore, the constituent elements presented in the accompanying drawings and the detailed description may include not only the constituent elements essential to solving the problems, but also, constituent elements that are not essential to solving the problems, in order to exemplify the technology described above. Therefore, with these inessential constituent elements being presented in the accompanying drawings and detailed description, there is no need to immediately accredit these inessential constituent elements as being essential.

The embodiments described above are intended to exemplify the technology in the present disclosure, and various changes, replacements, additions, omissions, etc., can be made within a range of the claims or a range equivalent to the claims.

INDUSTRIAL APPLICABILITY

The present disclosure can be applied to a digital camera, a movie camera, a portable phone with a camera, and other electronic devices provided with an imaging function.

KEY

1: Imaging device
11: Sub microcomputer
12: Charging IC
13: PD controller
15: Status liquid-crystal monitor
16: USB port
17: Analog switch
18: Power source switch-monitoring IC
19: Power source IC
20: Battery
30: Body controller
30a: Main microcomputer
31: Image processor
32: DRAM
33: Operation unit
34: Flash memory
35: Liquid crystal monitor
36: Wireless communication unit
37: CMOS image sensor
38: Sound output unit
40: Memory card
50: Optical system

CITATION LIST

Patent Literature

Patent Literature 1: Japanese Laid-open Patent Publication No. 2013-80392

The invention claimed is:

1. An imaging device in and from which a battery can be fitted and removed, the imaging device comprising:
a power supply terminal configured to be connected to an external device via a USB cable, through which power is supplied to the imaging device from the external device, and which maintains a connection between the external device and the imaging device via the USB cable regardless of whether the battery is fitted or removed; and
a controller configured to detect whether or not the battery has been removed from the imaging device while the power is being supplied from the external device to the imaging device in a case where the external device is a USB-connectable device, the controller configured to cut off the power supply from the external device according to the detection.

2. The imaging device as recited in claim 1, wherein the controller is configured to cut off the power supply from the external device after a specific time from the detection of a removal of the battery from the imaging device.

3. The imaging device as recited in claim 2, comprising an output unit configured to output warning information within the specific time.

4. The imaging device as recited in claim 1, wherein the controller is configured to determine an action that is being carried out by the imaging device, the controller configured to, when the determined action is a specific action, cut off the power supply from the external device after completion of the specific action.

5. The imaging device as recited in claim 4, wherein the specific action includes at least either one of an update of a program for the controller or image data recording.

6. The imaging device as recited in claim 1, wherein the external device is a USB PD-compliant device.

7. The imaging device as recited in claim 2, wherein the controller is configured to determine an action that is being carried out by the imaging device, the controller configured to, when the determined action is a specific action, cut off the power supply from the external device after completion of the specific action.

8. The imaging device as recited in claim 3, wherein the controller is configured to determine an action that is being carried out by the imaging device, the controller configured to, when the determined action is a specific action, cut off the power supply from the external device after completion of the specific action.

* * * * *